Figure 1:
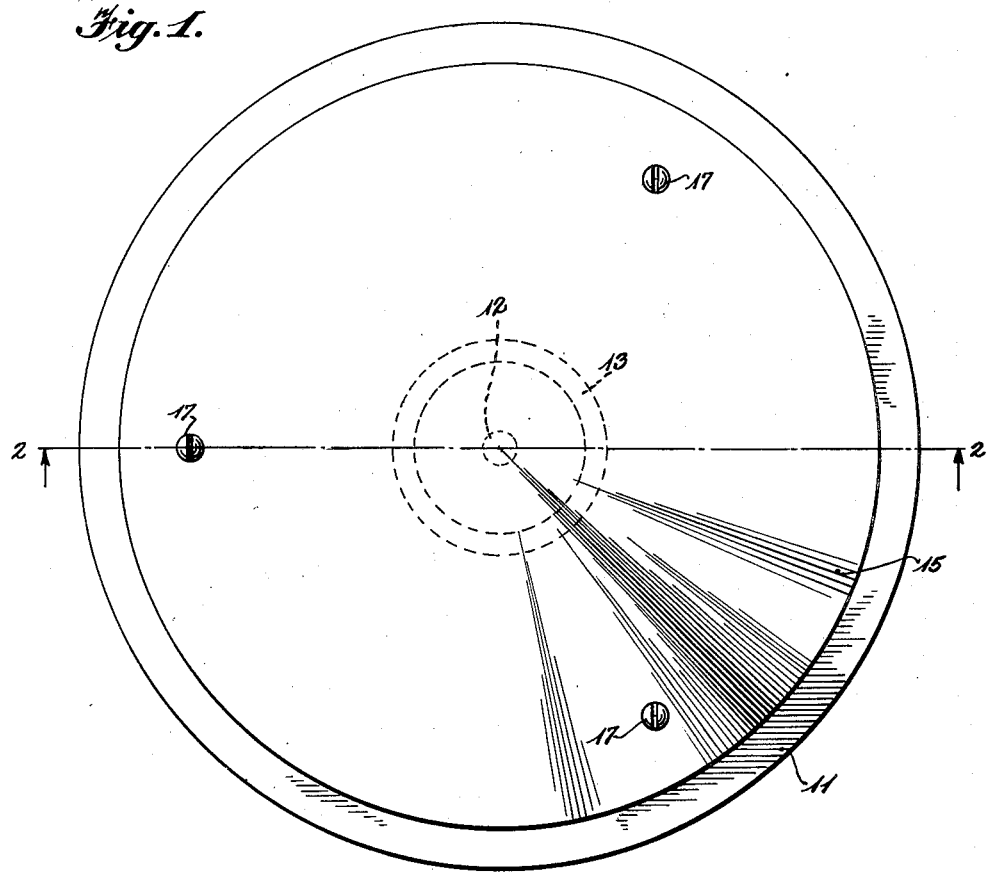

April 24, 1951     W. W. VOSS     2,550,100
DISCHARGE DEVICE

Filed Jan. 15, 1946     4 Sheets-Sheet 1

INVENTOR.
*Walter W. Voss*
BY
*ATTORNEY*

April 24, 1951  W. W. VOSS  2,550,100
DISCHARGE DEVICE

Filed Jan. 15, 1946  4 Sheets-Sheet 2

INVENTOR.
Walter W. Voss
BY
L. Donald Meyers
ATTORNEY

April 24, 1951    W. W. VOSS    2,550,100
DISCHARGE DEVICE

Filed Jan. 15, 1946    4 Sheets-Sheet 3

INVENTOR.
Walter W. Voss
BY
L. Donald Myers
ATTORNEY

April 24, 1951 W. W. VOSS 2,550,100
DISCHARGE DEVICE

Filed Jan. 15, 1946 4 Sheets-Sheet 4

INVENTOR.
Walter W. Voss
BY
L. Donald Myers
ATTORNEY

Patented Apr. 24, 1951

2,550,100

UNITED STATES PATENT OFFICE 2,550,100

DISCHARGE DEVICE

Walter W. Voss, Chicago, Ill., assignor to Cardox Corporation, Chicago, Ill., a corporation of Illinois Application January 15, 1946, Serial No. 641,297

12 Claims. (Cl. 169—11)

This invention relates to discharge apparatus and more particularly to devices of this character for delivering carbon dioxide to extinguish fires.

The use of liquid carbon dioxide to extinguish fires has had recent widespread development. It has been used both on indoor and outdoor fires. In extinguishing indoor fires, the carbon dioxide snow and vapor mixture may be discharged directly upon the fire in a fairly concentrated stream, or it may be distributed throughout the room in which the fire is taking place in order that carbon dioxide vapor may inert the atmosphere within the room. In extinguishing outdoor fires, the carbon dioxide snow and vapor will be played directly upon the fire to put it out.

These several different ways in which carbon dioxide is utilized to extinguish fires have a common problem in that the discharge device must not freeze up with carbon dioxide snow during operation, and moreover, it must reduce the velocity of the issuing stream. Thus, some means must be present in the discharge device to reduce the violence of the escaping and expanding carbon dioxide stream so that in the case in which it is being used to flood a room, it will have a better inerting effect as a result of being more widely distributed about a room so that the snow in the discharge will be vaporized by the absorption of heat from the atmosphere. In the case in which the carbon dioxide is played directly upon a fire, the stream must not be so strong that it will tend to blow away the combustible material.

In accordance with the present invention, discharge apparatus is provided which involves means for distributing the released carbon dioxide snow and vapor through a relatively small opening without the usual attendant risk of freezing up.

Another object of the invention is to provide a discharge apparatus which may be used successfully to inert a complete room.

Another object of the invention is to provide a discharge device having a restricted opening for the release of the carbon dioxide snow and vapor which will be self-cleaning in its action in the event of clogging due to the accumulation of snow.

A further object of the invention is to provide a discharge apparatus which includes a restricted orifice nevertheless capable of discharging a large quantity of carbon dioxide snow and vapor so that the velocity of the stream will be reduced.

A still further object of the invention is to provide a discharge apparatus which will cause segregation of the snow and vapor formed from the released liquid carbon dioxide and which will not freeze up although it is made of relatively small size.

Other objects of the invention will hereinafter appear.

Figure 2:
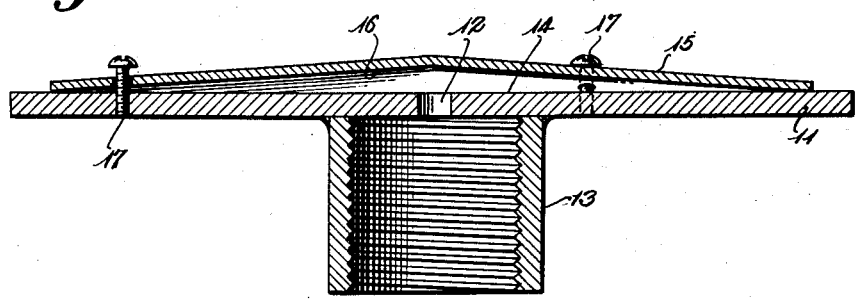
Figure 3:
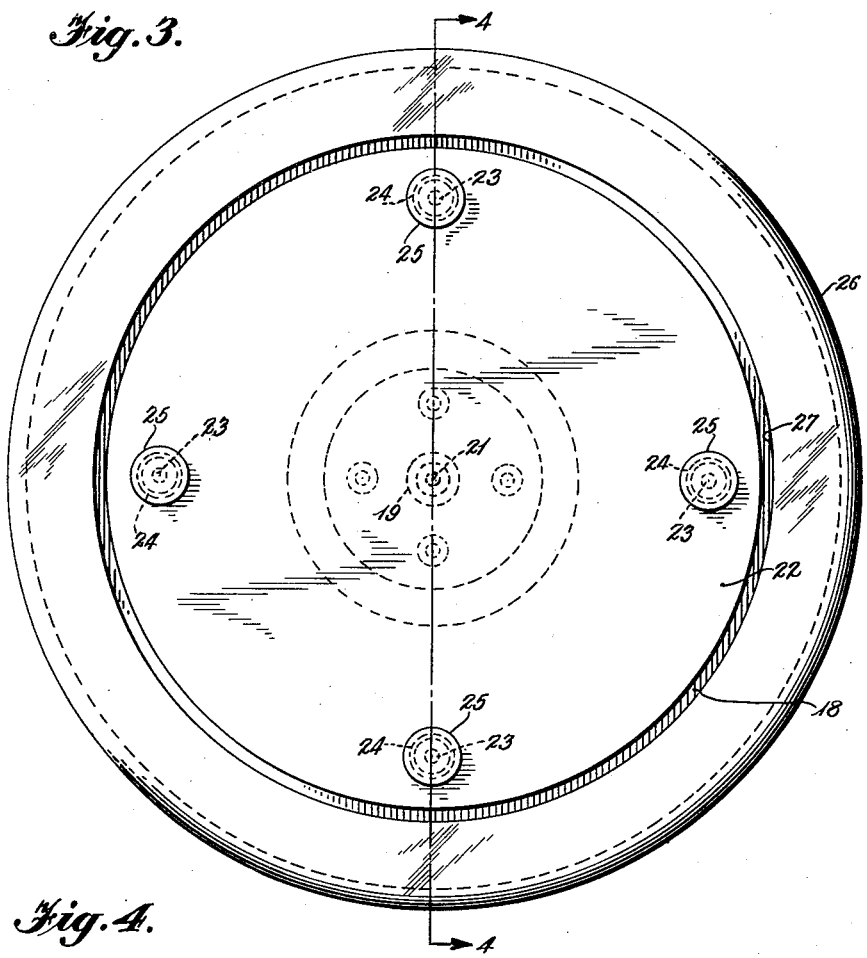
Figure 4:
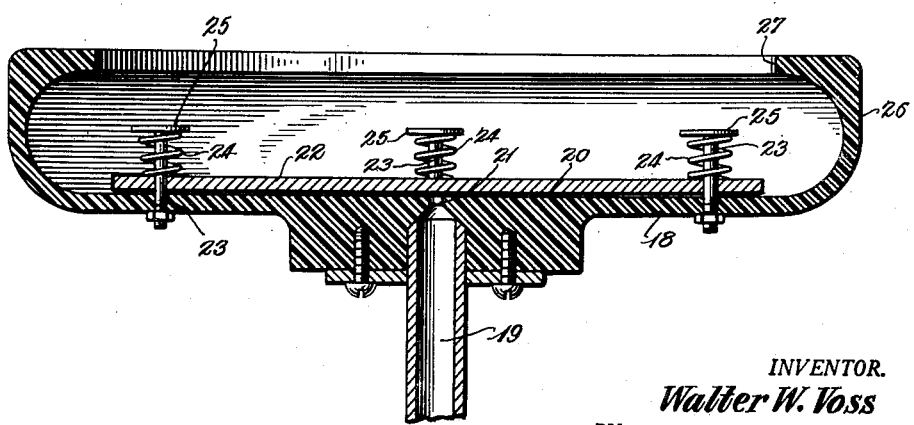
Figure 5:
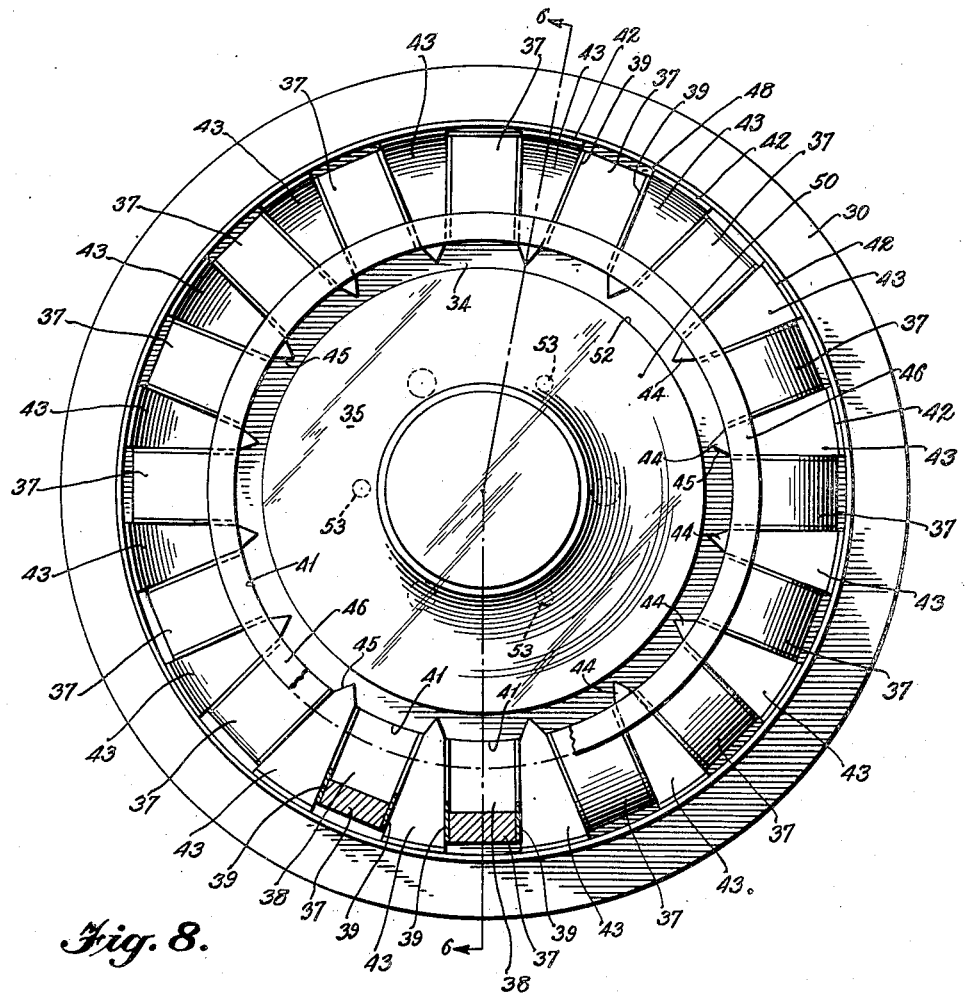
Figure 8:
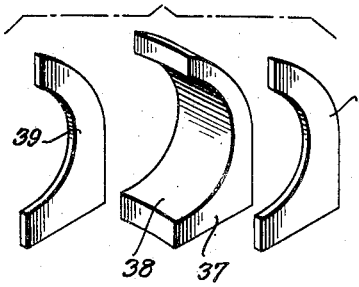
Figure 9:
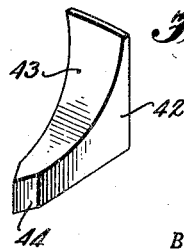
Figure 6:
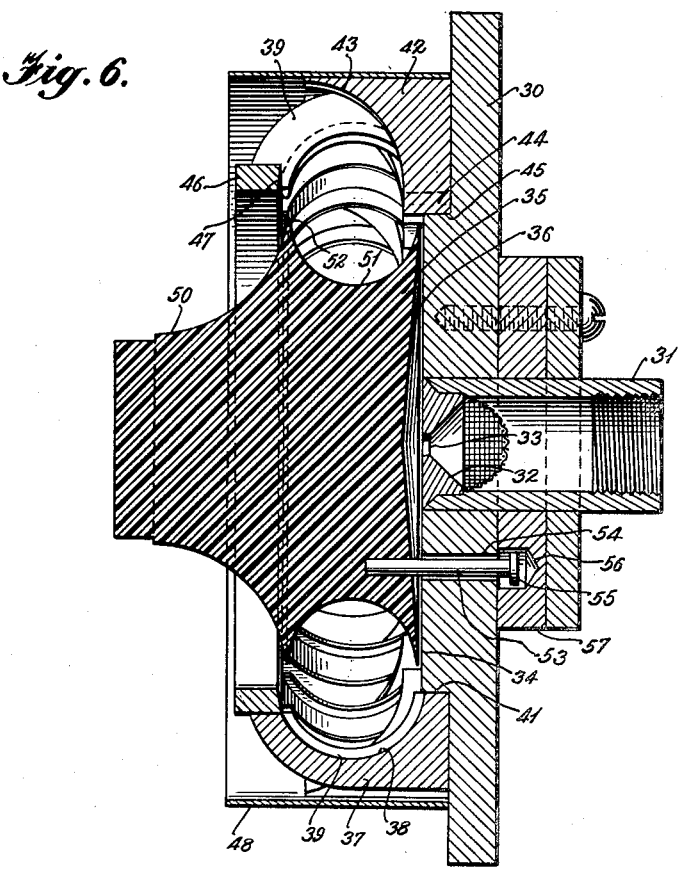
Figure 7:
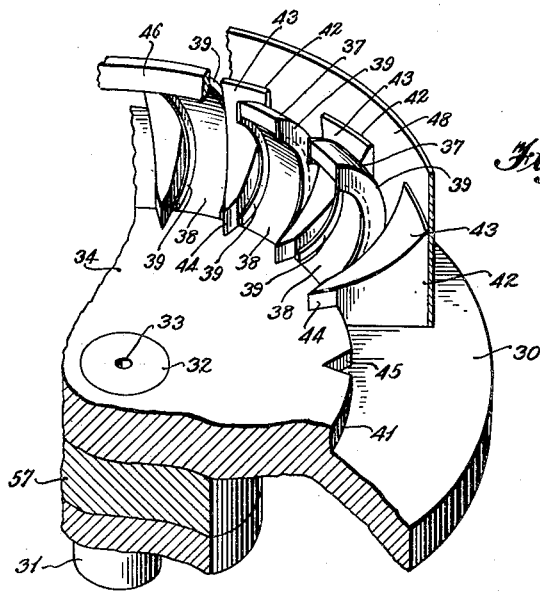

In the drawings:

Figure 1 is a face view of a discharge apparatus embodying the invention having especial application to inert an enclosed chamber, Figure 2 is a sectional view on the line 2—2 of Figure 1, Figure 3 is a face view of another discharge apparatus embodying the invention and which is especially suitable for direct application of the liquid carbon dioxide, Figure 4 is a sectional view on the line 4—4 of Figure 3, Figure 5 is a face view of another discharge apparatus embodying the invention and which includes means for causing segregation and separate delivery of carbon dioxide snow and vapor for direct application upon a fire, Figure 6 is a sectional view on the line 6—6 of Figure 5, Figure 7 is a perspective view of a fragmentary part of the base portion of the discharge apparatus of Figures 5 and 6, Figure 8 is an exploded view in perspective of the parts of one of the directing units which causes segregation of the vapor and snow in the apparatus of Figures 5 and 6, and Figure 9 is a perspective view of one of the vapor diverting and directing elements of the apparatus of Figures 5 and 6.

Referring first to the discharge apparatus shown in Figures 1 and 2, this includes a base or body member 11 having an orifice 12 therethrough. As is here shown, the base member 11 is a flat plate presenting plane surfaces on both of its sides, but the invention is not limited in this respect. To one side of the base member 11 is attached, as by welding, a coupling 13 which is internally threaded for the attachment of a pipe or conduit through which liquid carbon dioxide is to be supplied. It is apparent, however, that this side of plate 11 to which the coupling 13 is attached may have any formation and may in fact be so shaped that the coupling 13 is an integral part of the plate 11.

The opposite face 14 of the base member 11 from the coupling 13 may have any formation, but it should be regular about the opening 12. Thus, this face 14 may be either slightly concave or slightly convex instead of being flat, as shown, in order to obtain the advantages of the invention.

Opposing the face 14 of the base member 11 is a movable member 15. In the structure here shown this member 15 is a thin disc of uniform thickness throughout but this is not a limitation upon the structure. It is only important that the movable member 15 present a surface 16 which opposes the surface 14 and at its periphery may come in contact with, or at least, in close juxtaposition to the surface 14. The under surface 16 in the arrangement here shown is a concave shape, but this is not important since this surface may be flat or it may even be convex if the surface 14 is also convex so that the periphery of the movable member 15 may come close to the surface 14.

By dishing the movable member 15 as shown, its mechanical rigidity and strength is increased and it consequently can be made of thinner material. Also, by having the movable member 15 and the base member 11 closer together at the rim of the movable member 15 than at its center, the tendency for vibration to occur is reduced.

It is important that the movable member 15 be of considerably larger size than the discharge opening 12. As a consequence of the large size of the movable member 15, the discharge orifice which is presented completely around its periphery between it and the base member 11 is of considerable length and only a slight separation between the movable member 15 and the base member 11 results in a discharge opening of considerable area and distribution.

It will be evident that the base member 11 need not be of the circular shape which is shown here, since its peripheral formation plays no part in the functioning of the discharge device. It is preferable that the movable member 15 have a circular shape and that this periphery be concentric with respect to the axis of the opening 12 so that the discharge orifice which is formed at its periphery will be at equal radial distances from the opening 12.

To prevent lateral movement of the movable member 15 so as to thereby maintain it concentric with respect to the opening 12, retaining means are provided. As is here shown, this retaining means includes screws 17 which pass through openings in the movable member 15 and thread into the base member 11. Three of these screws 17 at equi-distant intervals are shown in the drawings, but this is not an essential number. If the device were to be positioned so that the disc 15 were on top, it may not be necessary that the retaining means be headed, since there will be no tendency for the disc to be completely blown off the plate 11, but it is preferable to employ headed retaining means to prevent complete accidental dislodgment of the disc 15.

When liquid carbon dioxide is supplied to the coupling 13, it is converted to a mixture of snow and vapor as it passes through the opening 12 and expands within the space between the surfaces 14 and 16. It will be appreciated that if these two surfaces are substantially flat the surfaces will separate to such an extent that there will be a further expansion of the carbon dioxide snow and vapor mixture. This expansion results in an increase in the velocity of flow.

The apparatus, therefore, serves to transform a large portion of the static head of the carbon dioxide within the coupling 13 into a velocity head in issuing from the orifice at the periphery of the disc 15. This transformation results in a decrease in the static head of the carbon dioxide since in accordance with Bernoulli's theorum, the total head remains constant, disregarding friction losses. As a consequence, the pressure head between the movable member 15 and the base member 11 will be less than atmospheric pressure, and the movable member 15 will therefore be forced toward the base member 11 so that it will not become completely dislodged therefrom. The movable member 15 will therefore seek a distance from the base member 11 so that the forces acting on it are in equilibrium and a relatively thin orifice will be presented around the periphery of the disc for the escape of the carbon dioxide.

The carbon dioxide will, therefore, issue in a thin sheet continuously around the discharge apparatus and in this manner the carbon dioxide will be distributed over a wide area. Any accumulation of snow in the escape orifice will reduce the velocity of the flow between surfaces 14 and 16 and therefore result in an increase of pressure between these surfaces. As a consequence, the movable member 15 will move further away from the base member 11 so that a new equilibrium position will be established and this movement of the movable member 15 will widen the discharge orifice to such an extent that the snow which is clogging the orifice will be blown out. After the accumulated snow is thus removed, the member 15 will return to its former equilibrium position. The discharge apparatus, therefore, has a self-cleaning action.

In using the device to totally flood a room, it preferably is positioned centrally of the room close to the ceiling with the movable member or disc 15 on the underside. The discharge apparatus thus will serve to discharge the carbon dioxide uniformly toward all the side walls of the room. The carbon dioxide vapor will be uniformly distributed throughout the room and the resulting inert atmosphere will extinguish the fire.

As the carbon dioxide snow and vapor mixture which issues from between the surfaces 14 and 16 is in a thin sheet and escapes directly into the atmosphere, it will entrain a considerable amount of air. This is important in the case of a total flooding operation because this air, due to its relative warmth, causes quick vaporization of the snow portion of the released mixture. As a consequence, substantially all of the released carbon dioxide will be present as vapor and the maximum immediate inerting effect will be obtained.

The discharge apparatus of Figures 3 and 4 includes a base member 18 corresponding to the base member 11 of the apparatus of Figures 1 and 2. This base member provides means for attachment thereto of a supply conduit 19 and presents a surface 20 which corresponds to the surface 14 in Figure 2. This surface 20 may have other shapes as explained in connection with surface 14 so long as it is of regular formation. An opening 21 is formed through the base member 18 for the escape of liquid carbon dioxide being supplied through conduit 19.

A movable member 22 opposes the surface 20 of the base member 18. The opposing surface of the movable member 22 is here shown to be flat, but it may have the other formations discussed in connection with surface 16 of Figure 2 to which it corresponds. As is here shown, this movable member 22 is a flat disc of uniform thickness. To prevent lateral movement of the movable member 22, posts 23 are attached to the base member 18 and they pass through openings in the movable member 22. The structure of this apparatus, however, includes springs 24 which surround the posts 23 and are positioned between the plate 22 and heads 25 on the posts. These springs 24 serve to create a force which is additive to that of atmospheric pressure to force the plate 22 toward the base member 18. Consequently, the use of springs enables a movable member of smaller outer surface area, as compared to the area of opening 21, to be employed.

The discharge apparatus of Figures 3 and 4, since it is intended to be used for direct application of the carbon dioxide upon a fire, includes the additional provision of means for concentrating the sheet of carbon dioxide which is escaping from the orifice presented between the movable member 22 and the base member 18. To accomplish this purpose, the base member 18 is brought forwardly by side wall 26 around the disc 22 to form a chamber having a forward discharging opening 27. The inner surface of the side wall 26 is preferably curved, as shown, so that it will serve to smoothly turn the issuing sheet of carbon dioxide to converge it into a single stream of large cross section issuing from the opening 27.

It will thus be seen that the small stream which escapes from the opening 21 in the base member 18 is released and expanded within the discharge apparatus and finally issues through the considerably larger opening 27. As a consequence of this large cross sectional area of the final discharge stream, it will not have such a high velocity that it cannot be used to play directly upon a fire which would be spread by a strong stream. For example, if burning cotton waste is to be extinguished, the use of this apparatus will not blow the waste about, and consequently, the stream composed of a mixture of vapor and snow can be played continuously upon this burning material.

The discharge apparatus shown in Figures 5 to 9, inclusive, like the apparatus shown in Figures 3 and 4, is to be used for the direct application of carbon dioxide upon a fire, but this apparatus includes means for segregating the snow and vapor which results from the release of the liquid carbon dioxide. Moreover, this apparatus serves to direct the snow as a core surrounded by a sheath of vapor against the fire. The general principle of this segregation and separated discharge of carbon dioxide snow and vapor is explained and claimed in Patents 2,357,039 and 2,357,040, issued August 29, 1944, to H. V. Williamson.

The base or body member includes a plate 30 from one side of which projects a coupling 31 for the attachment of a supply pipe or conduit. Within the end of the coupling 31 is a plug 32 having a restricted orifice 33 therethrough. By replacing the plug 32, orifices 33 of different sizes may be provided in the apparatus. The plate 30 presents a surface 34 which corresponds to the surface 14 in Figure 2 and may have the formations discussed in connection with surface 14.

Opposing the surface 34 of plate 30 is a movable member 35 and, as here shown, this is made as a relatively large body for a purpose which will be described later. This movable body 35 presents a surface 36 which corresponds to the surface 16 in Figure 2 and may have the formations described for surface 16. The carbon dioxide snow and vapor mixture issues in a thin sheet continuously around the periphery of the body 35 between the surfaces 34 and 36. This issuing sheet of carbon dioxide is received by a plurality of directing members 37 which present inwardly facing curved surfaces 38. The directing units also include side walls 39 which extend inwardly beyond the curved surface 38 so that each of the directing units 37 has a channelled inner face. It will be appreciated that the directing units may be made in one piece with this channelled inner surface instead of the built-up construction here shown.

The directing units 37 are positioned so that the sheet of carbon dioxide issuing from between the surfaces 34 and 36 will flow directly upon their portions which are toward the plate 30. To position the directing units in this manner and uniformly around the periphery of the movable body 35, they are mounted against a cylindrical shoulder 41 of the base plate 30. The directing units 37 may be held against this shoulder 41 and against the plate 30 in any manner.

The side walls of the directing units 37 are preferably substantially parallel and the directing units are slightly spaced apart. In the spaces between the directing units 37 are wedge-shaped members 42 which present a curved surface 43. The curved surface 43, however, is not so sharply curved that it returns toward the interior, but instead its outer portion flares forwardly so that any vapor flowing therealong will be directed forwardly from the discharge apparatus.

The inner apex portions 44 of the wedge-shaped members 42 project inwardly beyond the entrance edges of the curved surfaces 38 and to receive these apex portions notches 45 are formed in the shoulder 41, as appears in Figure 7. These apex portions 44 by being of wedge shape consequently divert the issuing sheet of carbon dioxide snow and vapor mixture toward the directing units 37 so that all of it must pass over the curved surfaces 38 and none of it will pass directly on to the curved surfaces 43 of the wedge-shaped members 42.

A ring 46 is attached to the outer ends of all of the directing units 37. As appears from Figure 6, the inner surface 47 of ring 46 should be substantially flush with the adjacent portion of the surfaces 38 so that the material flowing along the surfaces 38 and leaving their outer edges will pass over the inner face of the ring 46 and be continued in a direction generally toward the axis of the discharge apparatus. This inner surface 47 of ring 46 may be slightly inclined to continue the general curvature of the adjacent portion of the curved surfaces 38.

Outwardly from the wedge-shaped members 42 is a cylindrical shell 48. This cylindrical shell 48 should fit closely against the backs of the wedge-shaped members 42 and should extend forwardly beyond them a substantial distance. The vapor flowing along the surfaces 43 of the wedge-shaped members 42 will, therefore, pass upon the inner surface of this cylindrical shell 48 to be directed forwardly.

In flowing over the curved surfaces 38 segregation will occur between the carbon dioxide vapor and snow, as is explained in Patent 2,357,039. The snow, being heavier, will hug the surfaces 38 and force the vapor inwardly, as is explained in the aforementioned patent. The vapor will consequently spill over the sides of the channel formed in these directing units by the sides 39 thereof and this vapor will pass upon the curved surfaces 43 of the wedge-shaped members 42 and will be forwardly directed from the apparatus.

The snow, however, will remain upon the channelled surface 38 and will eventually leave its outer most forward edge and pass over the inner surface 47 of the ring 46. This snow will then pass upon an outer curved surface 50 of the movable body member 35. Rearwardly from the curved surface 50 the body member 35 is formed with a peripheral groove presenting a curved surface 51 so that a relatively sharp edge 52 is formed upon this body member 35. This sharp edge 52 will split off the more completely segregated snow which is positioned closest to the inner surface 47 of ring 46 so that this separated snow will pass on to and over the curved surface 50. However, the less segregated snow and its vapor which are not split off by the edge 52 will be directed upon the curved surface 51 from which it will be returned to the interior of the apparatus where it again will be subjected to the segregating action.

It will be noted that the forwardly converging formation of the curved surface 50 at the outer end of the movable body member 35 will cause the snow to converge into a single stream issuing from the center of the device. The vapor which is being directed forwardly by the inner surface of the cylindrical shell 48 will be caused to flow forwardly as a sheath around the outside of this inner core of snow. As is explained in Patent 2,357,039, this has the advantage of causing a further travel of the snow and reduces heat transmission to it because of the insulating effect of the surrounding vapor.

Any tendency for snow to collect at the discharge orifice between the surfaces 34 and 36 is overcome by the movement of the body member 35 away from the base plate member 30 so that this orifice is widened and the material will be blown out. Lateral movement of the body member 35 under the influence of this action is prevented by pins 53 which are attached to the body member 35 and extend through slightly larger holes 54 in the base member 30. Although during operation there will be a force, as has been explained, which will urge the body member 35 toward the base member 30, heads 55 are formed on the pins 53 to prevent complete displacement of the body member 35, due to shocks or during periods when the discharge apparatus is not in use. To protect the heads 55, they may be positioned within recesses 56 of a plate 57 attached to the rear face of the base plate 30.

Movement of the body member 35 toward or away from the base member 30 causes the dividing edge 52 of the body member 35 to move in an axial direction with respect to the under face 47 of the ring 46. This longitudinal movement of the dividing edge 52 causes it to split off more or less of the snow depending upon its instantaneous position. The distance, in an axial direction between the dividing or splitting edge 52 and the under surface 47, is referred to as the "snow slit" and its magnitude is of importance because it regulates the tendency of the discharge apparatus to freeze up in this region. For example, upon an increased formation of snow, the movable body member 35 should move closer to the base member 30 so that the snow slit will be increased in thickness and this additional amount of snow will be split off for immediate discharge from the device.

In practice, it has been found that this action occurs because, if liquid carbon dioxide is supplied from a source storing it at a low temperature, an increased amount of snow will be formed. Experience has shown that for this liquid carbon dioxide of lower temperature, the movable body member 35 finds its equilibrium position nearer to the base member 30 and this consequently widens the snow slit so that an increased amount of snow is split off. The converse relationship exists if the carbon dioxide which is being supplied is at a higher temperature.

The discharge apparatus of Figures 5 to 9, inclusive, includes the feature of the devices of Figures 1 to 4 of reducing the high pressure of the source of carbon dioxide to a relatively low velocity stream. Thus, with the device of Figures 5 to 9, although the carbon dioxide issues in a small stream at high pressure and high velocity from the opening 33, this device, despite its relatively small size, transforms this stream into a flow of large cross sectional area at a relatively low velocity. Because of the absence of any individual small holes through which snow and vapor must pass, and because a thin, continuous orifice of long length is used instead, the tendency of snow accumulation to occur is markedly reduced.

The discharge devices additionally have in common a base member which presents a substantially flat surface, and is opposed by the substantially flat surface of a movable member. Upon the admission of carbon dioxide snow and vapor into the space between these surfaces, resulting from the expansion of liquid carbon dioxide through an opening extending through the base member centrally of the movable member, the carbon dioxide issues in a thin sheet from between the members, and the movable member assumes a position at which the forces acting on it are in equilibrium.

What I claim is:

1. A fire extinguishing discharge nozzle for liquid carbon dioxide comprising a movable member which has a circular periphery and a base member which has a surface area the plane of which is parallel to the plane of said circular periphery, a conduit for expanding liquid carbon dioxide into the space between said members in the direction of the center of the movable member so that the carbon dioxide snow and vapor mixture resulting from said expansion will spread out laterally in all directions and issue as a sheet from between said members, a plurality of connecting elements for mounting said movable member for limited free movement on said base member, and means for receiving the issuing sheet of carbon dioxide snow and vapor mixture and diverting it to flow in a common direction from the device.

2. A fire extinguishing discharge nozzle for liquid carbon dioxide comprising a movable member which has a circular periphery and a base member which has a surface area the plane of which is parallel to the plane of said circular periphery, a conduit for delivering liquid carbon dioxide for expansion into the space between said members and in the direction of the center of the movable member so that the carbon dioxide snow and vapor mixture resulting from said expansion will spread out laterally in all directions and issue as a sheet from between said members, a plurality of connecting elements for mounting said movable member for limited free movement on said base member, and a wall encircling the periphery of the member of circular shape to receive the issuing sheet of carbon dioxide snow and vapor mixture and divert it to flow forwardly substantially as a single stream from the device.

3. A fire extinguishing discharge nozzle for liquid carbon dioxide comprising a base member having a central substantially flat portion and a peripheral wall extending forwardly from said flat portion to define a chamber having a discharge opening, a movable member having at least a portion thereof in said chamber and presenting a substantially flat surface opposing said central portion of the base member, said central portion having an opening therethrough for the delivery of liquid carbon dioxide for expansion into the space between the base member and movable member so that the carbon dioxide snow and vapor mixture resulting from said expansion will spread out laterally in all directions and issue as a sheet from said space, a plurality of connecting elements for mounting said movable member on said base member for limited free movement in a direction normal to said flat portion to a position at which the forces acting on it are in equilibrium and thereby being movable to a further distant position to effect a self-cleaning action for discharging any accumulated snow, and said peripheral wall serving to turn the sheet of issuing carbon dioxide to direct it forwardly through said discharge opening.

4. A fire extinguishing discharge nozzle for liquid carbon dioxide comprising a base member presenting a substantially flat surface, a movable member presenting a substantially flat circular surface opposing said surface of the base member, said base member having an opening therethrough for the expansion of liquid carbon dioxide into the space between the members for issuance from said space in sheet form around the entire periphery of said surface of the movable member, said movable member assuming a position at which the forces acting on it are in equilibrium and being movable to a more distant position to effect removal of any snow that accumulates in said space, said sheet of issuing carbon dioxide containing a mixture of vapor and snow due to the sudden release of the liquid carbon dioxide, a plurality of spaced longitudinally channelled deflecting units arranged in a circle about said movable member to receive the issuing sheet of carbon dioxide snow and vapor mixture and cause segregation of the snow and vapor in passing thereover, said units being adapted to retain the segregated snow and permit the vapor to spill over the sides of the units, means for dividing the segregated snow from the vapor and collecting and directing the snow from the device in a stream, and means disposed between the deflecting units to receive the divided vapor and the vapor spilling over the sides of the channelled deflecting units and to direct the received vapor in surrounding relation to the snow stream.

5. A fire extinguishing discharge nozzle for liquid carbon dioxide comprising a base member presenting a substantially flat surface, a movable member presenting a substantially flat circular surface opposing said surface of the base member, said base member having an opening therethrough for the expansion of liquid carbon dioxide into the space between the members for issuance from said space in sheet form around the entire periphery of said surface of the movable member, said movable member assuming a position at which the forces acting on it are in equilibrium and being movable to a more distant position to effect removal of any snow that accumulates in said space, said sheet of issuing carbon dioxide containing a mixture of vapor and snow due to the sudden release of the liquid carbon dioxide, a plurality of spaced longitudinally channelled deflecting units arranged in a circle about said movable member to receive the issuing sheet of carbon dioxide snow and vapor mixture and cause segregation of the snow and vapor in passing thereover, said units being adapted to retain the segregated snow and permit the vapor to spill over the sides of the units, means for dividing the segregated snow from the vapor and collecting and directing the snow from the device in a stream, means disposed between the deflecting units to receive the divided vapor and the vapor spilling over the sides of the channelled deflecting units and to direct the received vapor in surrounding relation to the snow stream, and a cylindrical shell surrounding said last-named means and projecting beyond them in the direction of the vapor flow to further confine the vapor about the snow stream.

6. A fire extinguishing discharge nozzle for liquid carbon dioxide comprising a base member presenting a substantially flat surface, a movable member presenting a substantially flat circular surface opposing said surface of the base member, said base member having an opening therethrough for the expansion of liquid carbon dioxide into the space between the members for issuance from said space in sheet form around the entire periphery of said surface of the movable member, said movable member assuming a position at which the forces acting on it are in equilibrium and being movable to a more distant position to effect removal of any snow that accumulates in said space, said sheet of issuing carbon dioxide containing a mixture of vapor and snow due to the sudden release of the liquid carbon dioxide, a plurality of spaced deflecting units arranged in a circle about said movable member to receive the issuing sheet of carbon dioxide snow and vapor mixture, said deflecting units having concavely curved surfaces over which the carbon dioxide flows to cause segregation of the snow and vapor, said movable member including a portion providing a circular edge disposed in the path of the carbon dioxide as it leaves the deflecting units and dividing the segregated snow from the vapor, the movable member extending beyond said circular edge and being of tapered formation to concentrate the divided snow into a stream, and means to receive the divided vapor and direct it in surrounding relation to the snow stream.

7. A fire extinguishing discharge nozzle for liquid carbon dioxide comprising a base member presenting a substantially flat surface, a movable member presenting a substantially flat circular surface opposing said surface of the base member, said base member having an opening therethrough for the expansion of liquid carbon dioxide into the space between the members for issuance from said space in sheet form around the entire periphery of said surface of the movable member, said movable member assuming a position at which the forces acting on it are in equilibrium and being movable to a more distant position to effect removal of any snow that accumulates in said space, said sheet of issuing carbon dioxide containing a mixture of vapor and snow due to the sudden release of the liquid carbon dioxide, a plurality of spaced deflecting units arranged in a circle about said movable member to receive the issuing sheet of carbon dioxide snow and vapor mixture, said deflecting units having concavely curved surfaces over which the carbon dioxide flows to cause segregation of the snow and vapor, said movable member including a portion providing a circular edge disposed in the path of the carbon dioxide as it leaves the deflecting units and dividing the segregated snow from the vapor, the movable member extending beyond said circular edge and being of tapered formation to concentrate the divided snow into a stream, the portion of the movable member between said surface and said circular edge presenting a concavely curved surface to divert the vapor to flow outwardly in a generally radial direction, and means disposed between said spaced deflecting units to receive the divided vapor and having curved surfaces to direct the vapor in surrounding relation to the snow stream.

8. A fire extinguishing discharge nozzle for liquid carbon dioxide, comprising a pair of members having relatively large substantially imperforate surface areas opposing each other in substantially flatwise relationship to provide a flow path therebetween having its discharge opening formed by the outer margins of said surface areas, means for introducing the liquid carbon dioxide centrally of the flow path for expansion to cause the resulting carbon dioxide snow and vapor mixture to issue in a substantially continuous thin sheet from the discharge opening, and a plurality of connecting elements for mounting one of said members on the other member for limited free movement in response to variations in the ratio of the pressure exerted by the expanding liquid carbon dioxide on said surface area of the movable member to the atmospheric pressure exerted on the movable member to vary the area of the discharge opening of said flow path.

9. A fire extinguishing discharge nozzle for liquid carbon dioxide comprising, a body member having a relatively small opening therethrough, the surface area of one face of said body member surrounding said opening being imperforate and substantially flat, a movable member positioned over the opening of said body member presenting a circular surface area opposing said surface area of the body member to form a flow path therebetween having a discharge opening at the outer margin of said movable member, means for attaching a conduit to said body for delivering liquid carbon dioxide through said opening in the body to the flow path for expansion to cause the resulting carbon dioxide snow and vapor mixture to spread laterally in all directions and issue from the discharge opening in a thin sheet, and a plurality of connecting elements for mounting said movable member for limited free movement on said body member so that the area of the discharge opening is variable in an inverse relationship with the velocity of the issuing mixture.

10. A fire extinguishing discharge nozzle for liquid carbon dioxide comprising, a body member having a relatively small opening therethrough, the surface area of one face of said body member surrounding said opening being imperforate and substantially flat, a movable member positioned over the opening of said body member presenting a circular surface area opposing said surface area of the body member to form a flow path therebetween having its discharge opening at the outer margin of said movable member, means for attaching a conduit to said body for delivering liquid carbon dioxide through said opening in the body to the flow path for expansion to cause the resulting carbon dioxide snow and vapor mixture to spread laterally in all directions and issue from the discharge opening in a thin sheet, a plurality of connecting elements for mounting said movable member on said body member for limited free movement in a direction axial of said opening in the body, and resilient means associated with said connecting elements for biasing the movable member toward the body member so that the area of the discharge opening is variable in an inverse relationship to the velocity of the issuing mixture and the pressure exerted by the resilient means.

11. A fire extinguishing discharge nozzle for liquid carbon dioxide comprising, a base plate having a relatively small orifice therethrough, a circular disc mounted upon one side of said base plate for movement toward and away from said base plate to form a variable flow path therebetween having its discharge opening at the outer periphery of said circular disc, a plurality of connecting elements for mounting said disc for limited free movement on the base plate and for retaining the disc substantially coaxial with said orifice, and conduit means attached to the other side of said base plate to deliver liquid carbon dioxide for expansion through the opening in said base plate to cause the resulting carbon dioxide snow and vapor mixture to issue laterally from the discharge opening of the flow path, the distance between the base plate and disc varying in an inverse relation with the velocity of the issuing mixture as a result of the free movement of said disc.

12. A fire extinguishing discharge nozzle for liquid carbon dioxide comprising, a flat base plate having a relatively small orifice therethrough, a circular disc mounted upon one side of said base plate for movement toward and away from said base plate to form a variable flow path therebetween having its discharge opening at the outer periphery of said circular disc, a plurality of connecting elements for mounting said disc for limited free movement on said base plate and for retaining the disc substantially coaxial with said orifice, and conduit means attached to the other side of said base plate to deliver liquid carbon dioxide for expansion through the opening in said base plate to cause the resulting carbon dioxide snow and vapor mixture to issue laterally from the discharge opening of the flow path and continue in a generally radial direction past the outer periphery of the base plate, the distance between the base plate and disc varying in an inverse relation with the velocity of the issuing mixture as a result of the free movement of said disc.

WALTER W. VOSS.

REFERENCES CITED

The following references are of record in the file of this patent:

UNITED STATES PATENTS

| Number | Name | Date |
| --- | --- | --- |
| 515,491 | Hanford | Feb. 27, 1894 |
| 551,938 | Travis | Dec. 24, 1895 |
| 573,157 | Meyer | Dec. 15, 1896 |
| 579,173 | Oberwalder | Mar. 23, 1897 |
| 675,672 | Potter | June 4, 1901 |
| 920,145 | Hughes | May 4, 1909 |
| 1,040,899 | Dahmen | Oct. 8, 1912 |
| 1,502,822 | Hill | July 29, 1924 |
| 1,769,178 | Delany | July 1, 1930 |
| 2,216,072 | Ensminger | Sept. 24, 1940 |
| 2,352,399 | Myers | June 27, 1944 |
| 2,357,039 | Williamson | Aug. 29, 1944 |
| 2,387,963 | Williamson | Oct. 30, 1945 |